United States Patent
Lee et al.

(10) Patent No.: US 9,812,856 B2
(45) Date of Patent: Nov. 7, 2017

(54) MODULATION MODE CONTROL CIRCUIT, SWITCH CONTROL CIRCUIT INCLUDING THE MODULATION MODE CONTROL CIRCUIT AND POWER SUPPLY DEVICE INCLUDING THE SWITCH CONTROL CIRCUIT

(71) Applicant: FAIRCHILD KOREA SEMICONDUCTOR LTD., Bucheon-si (KR)

(72) Inventors: Won-Tae Lee, Cheonan-si (KR); Ji-Hoon Jang, Incheon (KR); Hyeong Seok Baek, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 152 days.

(21) Appl. No.: 14/965,238

(22) Filed: Dec. 10, 2015

(65) Prior Publication Data

US 2016/0172958 A1    Jun. 16, 2016

Related U.S. Application Data

(60) Provisional application No. 62/090,004, filed on Dec. 10, 2014.

(51) Int. Cl.
*H02H 3/247* (2006.01)
*H02M 3/335* (2006.01)
(Continued)

(52) U.S. Cl.
CPC .............. *H02H 3/247* (2013.01); *H02M 1/00* (2013.01); *H02M 1/32* (2013.01);
(Continued)

(58) Field of Classification Search
CPC .... H02H 3/247; H02M 3/33592; H02M 1/00; H02M 1/32; H02M 1/36;
(Continued)

(56) References Cited

U.S. PATENT DOCUMENTS 7,660,133 B1    2/2010  Hwang et al.
7,773,398 B2    8/2010  Kyono
(Continued)

OTHER PUBLICATIONS

Champion Microelectronic Corporation, SLS (SRC/LLC+SR) Controller with 1 FM+2 PWMs, Oct. 16, 2015, 16 pages, Rev 2.7.
(Continued)

*Primary Examiner* — Jue Zhang

(57) ABSTRACT

A modulation mode control circuit includes a modulation mode controller configured to select modulation mode based on the result of a comparison between a control voltage and a predetermined PWM threshold voltage and to generate a PWM reference voltage using the PWM threshold voltage and the control voltage and a control signal generation unit configured to generate a first control signal based on the result of a comparison between an oscillation control signal for controlling a switching frequency and the control voltage and the result of a comparison between the oscillation control signal and the PWM threshold voltage and to generate a second control signal based on the result of a comparison between the oscillation control signal and the PWM reference voltage.

20 Claims, 7 Drawing Sheets

(51) Int. Cl.
  *H02M 1/00* (2006.01)
  *H02M 1/32* (2007.01)
  *H02M 1/36* (2007.01)

(52) U.S. Cl.
  CPC .......... *H02M 3/33592* (2013.01); *H02M 1/36* (2013.01); *H02M 2001/0003* (2013.01); *Y02B 70/1433* (2013.01); *Y02B 70/1475* (2013.01); *Y02P 80/112* (2015.11)

(58) Field of Classification Search
  CPC ....... H02M 2001/0003; Y02B 70/1433; Y02B 70/1475; Y02P 80/112
  See application file for complete search history.

(56) References Cited

U.S. PATENT DOCUMENTS

| | | | |
|---|---|---|---|
| 8,134,851 B2 | 3/2012 | Soldano et al. | |
| 8,638,571 B2 | 1/2014 | Tschirhart et al. | |
| 9,537,403 B2 | 1/2017 | Zhang et al. | |
| 2005/0258808 A1* | 11/2005 | Chen ..................... | H02H 7/1213 323/222 |
| 2008/0246450 A1* | 10/2008 | Matyas ................... | H02M 1/36 323/238 |
| 2012/0038341 A1* | 2/2012 | Michishita ............ | H02M 3/158 323/284 |
| 2012/0182003 A1* | 7/2012 | Flaibani ................ | H02M 3/156 323/284 |
| 2013/0314060 A1* | 11/2013 | Chen ........................ | G05F 1/46 323/234 |

OTHER PUBLICATIONS

Fairchild, FAN7688—Advanced Secondary Side LLC Resonant Converter Controller with Synchronous Rectifier Control, Nov. 2015, 31 pages, Rev. 1.3.

* cited by examiner

MODULATION MODE CONTROL CIRCUIT, SWITCH CONTROL CIRCUIT INCLUDING THE MODULATION MODE CONTROL CIRCUIT AND POWER SUPPLY DEVICE INCLUDING THE SWITCH CONTROL CIRCUIT

CROSS-REFERENCE TO RELATED APPLICATIONS

This application claims priority from U.S. Provisional Application No. 62/090,004, filed on Dec. 10, 2014 with the United States Patent and Trademark Office, the disclosure of which is incorporated herein by reference in its entirety.

BACKGROUND (a) Technical Field

Exemplary embodiments relate to a modulation mode control circuit, a switch control circuit including the modulation mode control circuit, and a power supply device including the switch control circuit.

(b) Description of the Related Art

The switching operation of a power switch for controlling a power supply device may be controlled either in pulse frequency modulation (hereinafter called "PFM") mode or pulse width modulation (hereinafter called "PWM") mode. The power supply device needs to select one of the two types of mode depending on a load and to control the switching operation of the power switch according to the selected mode.

SUMMARY

Exemplary embodiment provide a circuit capable of controlling modulation mode depending on a load, a switch control circuit including the circuit, and a power supply device including the switch control circuit.

A modulation mode control circuit according to an exemplary embodiment includes a modulation mode controller configured to select a modulation mode based on the result of a comparison between a control voltage and a predetermined PWM threshold voltage and generate a PWM reference voltage using the PWM threshold voltage and the control voltage and a control signal generation unit configured to generate a first control signal based on the result of a comparison between an oscillation control signal for controlling a switching frequency and the control voltage and the result of a comparison between the oscillation control signal and the PWM threshold voltage and to generate a second control signal based on the result of a comparison between the oscillation control signal and the PWM reference voltage.

The modulation mode controller includes a comparator configured to compare the PWM threshold voltage with the control voltage, a PWM threshold voltage generator configured to control the PWM threshold voltage in response to a first resistor that is externally connected, and a PWM reference voltage generator configured to generate the PWM reference voltage based on a difference between the PWM threshold voltage and the control voltage.

The PWM threshold voltage generator may generate a first current for controlling a voltage of the first resistor at a predetermined reference voltage, may mirror a third current which is the sum of the first current and a predetermined second current, may supply the mirrored current to a second resistor, and may generate the PWM threshold voltage by adding a predetermined offset voltage to a voltage generated from the second resistor.

The PWM threshold voltage generator may include a first operational amplifier configured to have an inverting terminal connected to the first resistor and a non-inverting terminal to which the reference voltage is inputted, a first transistor configured to have a gate connected to the output terminal of the first operational amplifier and one end connected to the first resistor, the first current flowing through the first transistor in response to the output of the first operational amplifier, a current source connected to the other end of the first transistor and configured to sink a second current, and a first current mirror circuit connected to the other end of the first transistor and configured to mirror the third current and supply the mirrored current to the second resistor.

The PWM threshold voltage generator further includes a second operational amplifier configured to have an output terminal and an inverting terminal connected to one end of the second resistor and a non-inverting terminal to which the offset voltage is inputted. The third current flows through the second resistor. A voltage at the other end of the second resistor is the PWM threshold voltage.

The PWM reference voltage generator may generate a fourth current based on the control voltage, may generate a fifth current based on the predetermined reference voltage, and may generate the PWM reference voltage using the PWM threshold voltage and a current corresponding to a difference between the fifth current and the fourth current.

The PWM reference voltage generator may include a third operational amplifier configured to have a non-inverting terminal to which the control voltage is inputted and an inverting terminal connected to a third resistor, a second transistor configured to have a gate connected to the output of the third operational amplifier and one end connected to the inverting terminal of the third operational amplifier, and a second current mirror circuit connected to the other end of the second transistor and configured to mirror the fourth current flowing through the second transistor.

The PWM reference voltage generator may include a fourth operational amplifier configured to have a non-inverting terminal to which the reference voltage is inputted and an inverting terminal connected to a fourth resistor, a third transistor configured to have a gate connected to the output of the fourth operational amplifier and one end connected to the inverting terminal of the fourth operational amplifier, and a third current mirror circuit connected to the other end of the third transistor and configured to mirror the fifth current flowing through the third transistor.

The PWM reference voltage generator includes a fifth operational amplifier configured to have a non-inverting terminal to which the PWM threshold voltage is inputted, an inverting terminal, and an output terminal connected to the inverting terminal, a fifth resistor connected between the output terminal of the fifth operational amplifier and a node from which the PWM reference voltage is generated, and a fourth current mirror circuit connected to the node and configured to mirror the fourth current. A current difference between the fifth current and the fourth current flows through the fifth resistor.

The control signal generation unit may include a first comparator configured to compare the control voltage with the oscillation control signal, a second comparator configured to compare the PWM threshold voltage with the oscillation control signal, and an AND gate configured to generate the first control signal based on the output of the first comparator and the output of the second comparator.

The control signal generation unit further includes a third comparator configured to compare a limit voltage for controlling a maximum frequency of the switching operation in PWM mode with the oscillation control signal and an OR gate configured to perform an OR operation of the output of the second comparator and the output of the third comparator. The AND gate generates the first control signal by performing an AND operation on the output of the OR gate and the output of the first comparator.

A switch control circuit according to an exemplary embodiment controls the switching operation of at least one power switch for controlling the power supply. The switch control circuit includes an oscillation control signal generator configured to generate an oscillation control signal for controlling the switching operation of the at least one power switch, a modulation mode control circuit configured to select a modulation mode based on the result of a comparison between a control voltage based on an output voltage of the power supply and a PWM threshold voltage determined by an external resistor, generate a PWM reference voltage using the PWM threshold voltage and the control voltage, generate a first control signal based on the result of a comparison between the oscillation control signal and the control voltage and the result of a comparison between a first signal and the PWM threshold voltage, and generate a second control signal based on the result of a comparison between the first signal and the PWM reference voltage, and an oscillator configured to generate at least one clock signal for controlling the at least one power switch using at least one of the first control signal and the second control signal in the selected modulation mode.

The oscillator may generate the at least one clock signal based on the first control signal if the selected modulation mode is PFM mode.

The oscillator may decrease the at least one clock signal to a low level in synchronization with the rising edge of the first control signal and may increase the at least one clock signal to a high level at a point of time at which the period in which the at least one clock signal is enabled in an immediately previous switching cycle has elapsed from a point of time at which the first control signal has the rising edge.

The oscillator may generate the at least one clock signal based on the first control signal and the second control signal if the selected modulation mode is PWM mode.

The oscillator may increase the at least one clock signal in synchronization with the rising edge of the second control signal and may decrease the at least one clock signal in synchronization with the rising edge of the first control signal.

The at least one clock signal includes first and second clock signals. The oscillator may increase the first clock signal in synchronization with the rising edge of the second control signal, may decrease the first clock signal and increase the second clock signal in synchronization with the rising edge of the first control signal, and may decrease the second clock signal at a point of time after the period in which the first clock signal is a high level has elapsed from a point of time at which the second clock signal rises.

The oscillator may start to increase the oscillation control signal at a point of time at which a first period has elapsed from a point of time at which the second clock signal falls. The first period may be a period from a point of time at which the oscillation control signal starts to an increase to the rising edge of the second control signal.

The oscillation control signal generator may generate the oscillation control signal by adding a voltage obtained by detecting a current according to the power supply to a voltage that increases during the period in which the at least one clock signal is enabled.

A power supply device according to an exemplary embodiment may include at least one power switch connected to a winding on a primary side, at least one synchronization rectification switch configured to generate an output voltage by synchronizing and rectifying a current flowing through a winding on a secondary side, and a switch control circuit configured to select a modulation mode based on the result of a comparison between a control voltage based on the output voltage and a PWM threshold voltage determined by a resistor, generate a PWM reference voltage using the PWM threshold voltage and the control voltage, generate a first control signal based on the result of a comparison between an oscillation control signal and the control voltage and the result of a comparison between a first signal and the PWM threshold voltage, generate a second control signal based on the result of a comparison between the first signal and the PWM reference voltage, and generate at least one clock signal for controlling the at least one power switch using at least one of the first control signal and the second control signal based on the selected modulation mode.

Exemplary embodiments provide a circuit capable of controlling modulation mode depending on a load, a switch control circuit including the circuit, and a power supply device including the switch control circuit.

DETAILED DESCRIPTION OF THE EMBODIMENTS

The present invention is described more fully hereinafter with reference to the accompanying drawings, in which exemplary embodiments of the present disclosure are shown. As those skilled in the art would realize, the described embodiments may be modified in various different ways, all without departing from the spirit or scope of the present invention. Furthermore, in order to clarify a description of the present invention, a description of parts not related to the description is omitted, and the same reference numbers are used throughout the specification to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a switching frequency means the frequency of a switching operation, and a duty cycle means the on period of a switch in one switching cycle.

Figure 1:
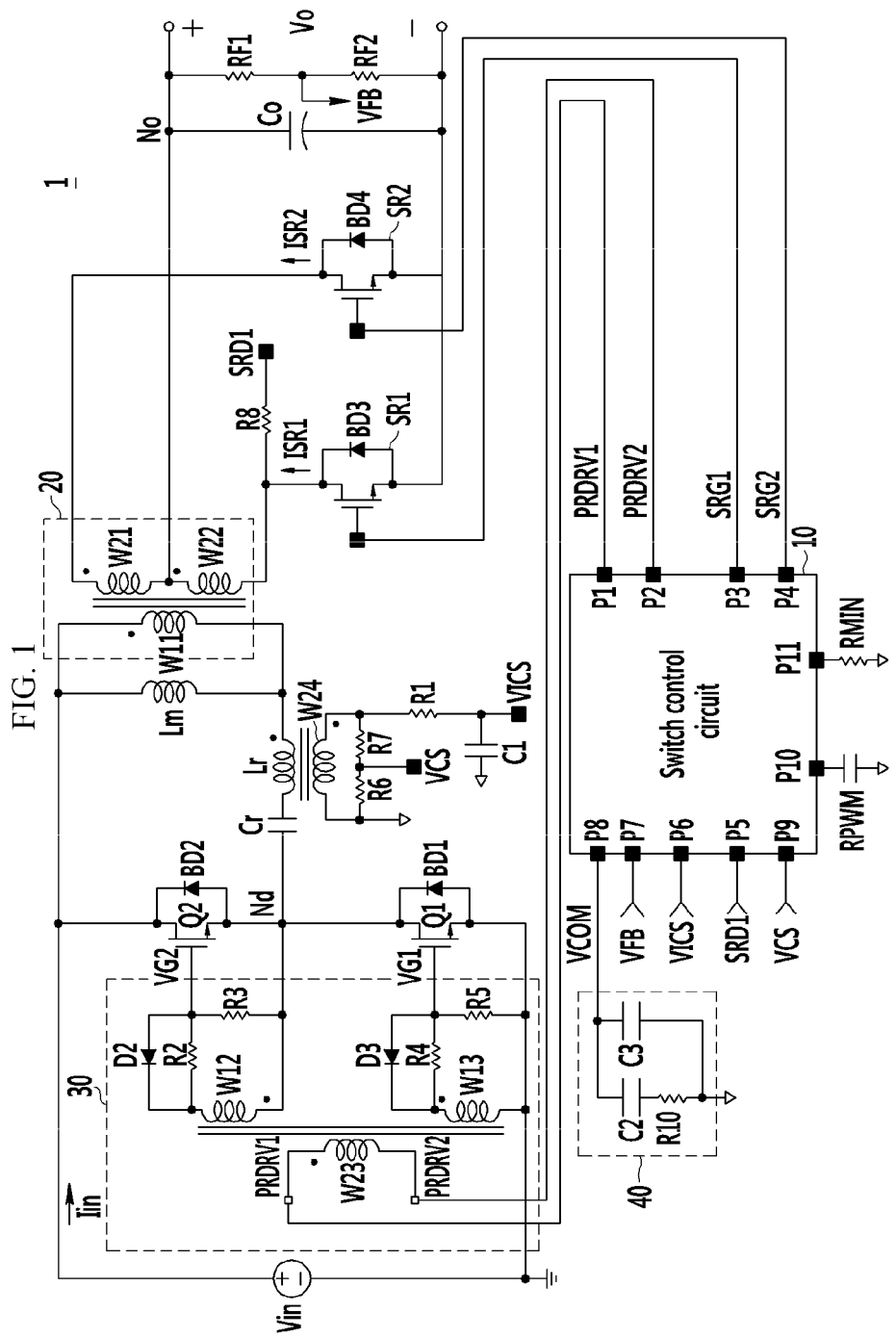
FIG. 1 is a diagram showing a power supply device to which a modulation mode control circuit according to an exemplary embodiment has been applied.

FIG. 1 is a diagram showing a power supply device to which a modulation mode control circuit according to an exemplary embodiment has been applied.

FIG. 1 illustrates a resonant converter as an example of the power supply device, but the present invention is not limited thereto. The resonant converter of FIG. 1 is a half-bridge LLC resonant converter, but converters to which the present invention may be applied are not limited to the half-bridge LLC resonant converter.

The resonant converter 1 includes a first switch Q1, a second switch Q2, a transformer 20, a gate driving circuit 30, a first synchronization rectification switch SR1, a second synchronization rectification switch SR2, and a switch control circuit 10.

Body diodes BD1 and BD2 are formed between the drains and sources of the first switch Q1 and second switch Q2, respectively. Each of the first and the second switches Q1 and Q2 is a power switch for controlling the supply of power.

The second switch Q2 and the first switch Q1 are connected in series between an input voltage Vin and a primary-side ground. The second switch Q2 and the first switch Q1 alternately switch. After a lapse of a first dead time since the second switch Q2 is turned off, the first switch Q1 is turned on. After a lapse of the first dead time since the first switch Q1 is turned off, the second switch Q2 is turned on.

The drain of the second switch Q2 is connected to the input voltage Vin, the source of the second switch Q2 and the drain of the first switch Q1 are connected at a node Nd, and the source of the first switch Q1 is connected to a ground on the primary side. The gate voltages VG2 and VG1 are supplied to gates of the second switch Q2 and the first switch Q1, respectively. The first switch Q1 and the second switch Q2 alternately perform switching, and the power supply is controlled based on the switching operation. For example, the power supply increases as the switching frequency of the first switch Q1 and the second switch Q2 decreases, and decreases as the switching frequency increases.

A capacitor Cr, a winding W1 on the primary side of the transformer 20, and an inductor Lr are connected in series between the input voltage Vin and the node Nd. Resonance occurs between the capacitor Cr, the primary winding W1, and the inductor Lr. A current "Iin" inputted to the primary side is controlled so that it becomes a sine wave by the resonance.

On the secondary side of the transformer 20, a winding W21 and a winding W22 are coupled to the primary winding W11 in an insulated manner at a predetermined winding ratio. The first synchronization rectification switch SR1 is connected to one end of the winding W22 on the secondary side, and a body diode BD3 is formed between the drain and source of the first synchronization current switch SR1. The second synchronization rectification switch SR2 is connected to one end of the winding W21 on the secondary side, and a body diode BD4 is formed between the drain and source of the second synchronization rectification switch SR2.

Hereinafter, the meaning that a current flows through the first and the second synchronization rectification switches SR1 and SR2 includes that the current flows when the first and the second synchronization rectification switches SR1 and SR2 are turned on and that the current flows through the body diodes BD3 and BD4.

The source of the first synchronization rectification switch SR1 is connected to a ground on the secondary side, and the drain of the first synchronization rectification switch SR1 is connected to the winding W22 on the secondary side, and a first gate voltage SRG1 is inputted to the gate of the first synchronization rectification switch SR1. The source of the second synchronization rectification switch SR2 is connected to the ground on the secondary side, and the drain of the second synchronization rectification switch SR2 is connected to one end of the winding W21 on the secondary side, and a second gate voltage SRG2 is inputted to the gate of the second synchronization rectification switch SR2.

The other end of the winding W21 and the other end of the winding W22 are connected to an output node No. A capacitor Co is connected between the output node No and the ground on the secondary side. The voltage of the output node No becomes an output voltage Vo.

The body diode BD3 becomes conductive by a current flowing through the winding W22 on the secondary side, and thus the first synchronization rectification switch SR1 is turned on. In response thereto, the current of the winding W22 on the secondary side is rectified by the first synchronization rectification switch SR1, thus flowing into the capacitor Co. The current flowing through the first synchronization current switch SR1 is hereinafter called a first synchronization rectification current ISR1.

The body diode BD4 becomes conductive by a current flowing through the winding W21 on the secondary side, and thus the second synchronization rectification switch SR2 is turned on. In response thereto, the current of the winding W21 on the secondary side is rectified by the second synchronization rectification switch SR2, thus flowing into the capacitor Co. The current flowing through the second synchronization current switch SR2 is hereinafter called a second synchronization rectification current ISR2.

The first and the second synchronization rectification currents ISR1 and ISR2 may be supplied to a load or may charge the capacitor Co. A ripple of the output voltage Vo is attenuated by the capacitor Co.

The gate driving circuit 30 includes a winding W23 on the secondary side, two windings W12 and W13 on the primary side, four resistors R2-R5, and two diodes D2 and D3.

A first driving voltage PRDRV1 is inputted to one end of the winding W23 on the secondary side, and a second driving voltage PRDRV2 is inputted to the other end of the winding W23 on the secondary side. The resistor R2 and the diode D2 are connected in parallel between one end of the winding W12 on the primary side and the gate of the second switch Q2. The other end of the winding W12 on the primary side is connected to one end of the resistor R3 and the node Nd. The resistor R2, the resistor R3, and the anode of the diode D2 are connected to the gate of the second switch Q2. The resistor R4 and the diode D3 are connected in parallel between one end of the winding W13 on the primary side and the gate of the first switch Q1. The other end of the winding W13 on the primary side is connected to one end of the resistor R5 and the ground on the primary side. The resistor R4, the resistor R5, and the anode of the diode D3 are connected to the gate of the first switch Q1.

The first switch Q1 performs a switching operation in response to the gate voltage VG1, and the second switch Q2 performs a switching operation in response to the gate voltage VG2. Since the first switch Q1 and the second switch Q2 are n channel transistors, an enable level of each of the gate voltage VG1 and the gate voltage VG2 is a high level, and a disable level is a low level.

When the first driving voltage PRDRV1 is a high level and the second driving voltage PRDRV2 is a low level, the current of the winding W12 on the primary side flows through the resistor R3 and the diode D2, and the current of the winding W13 on the primary side flows through the resistor R4 and the resistor R5. Accordingly, the gate voltage VG1 becomes a high-level voltage capable of turning on the first switch Q1, and thus the first switch Q1 is turned on. The gate voltage VG2 becomes a voltage lower than the source voltage of the second switch Q2, and thus the second switch Q2 is turned off.

When the second driving voltage PRDRV2 is a high level and the first driving voltage PRDRV2 is a low level, the current of the winding W12 on the primary side flows through the resistor R2 and the resistor R3, and the current of the winding W13 on the primary side flows through the resistor R5 and the diode D3. Accordingly, the gate voltage VG2 becomes a high-level voltage capable of turning on the second switch Q2, and thus the second switch Q2 is turned on. The gate voltage VG1 becomes a voltage lower than the source voltage of the first switch Q1, and thus the first switch Q1 is turned off.

When the input current "Iin" flows through the inductor Lr, a current is induced to the winding W24 on the secondary side, thereby generating a detection voltage VCS. For example, when the input current "Iin" flows toward the node Nd from the inductor Lr by a resonance, the current of the winding W24 on the secondary side flows into the ground on the secondary side through the resistor R7 and the resistor R6. In response thereto, a positive detection voltage VCS corresponding to the input current "Iin" is generated. When the input current "Iin" flows from the node Nd to the inductor Lr by a resonance, the current of the winding W24 on the secondary side flows through the resistor R6 and the resistor R7 from the ground on the secondary side. Accordingly, a negative detection voltage VCS corresponding to the input current "Iin" is generated. The detection voltage VCS is supplied to the switch control circuit 10 through a pin P9. The switch control circuit 10 may detect an overcurrent using the detection voltage VCS.

The resistor R1 is connected to one end of the winding W24 on the secondary side, and the other end of the resistor R1 is connected to one end of the capacitor C1 and a pin P6. The other end of the capacitor C1 is connected to the ground on the secondary side. A voltage corresponding to a current flowing through the winding W24 on the secondary side is integrated by through an RC filter including a resistor R1 and the capacitor C1. The result of the integration is information corresponding to a current supplied to a load (hereinafter called a "load current"). The result of the integration is a voltage for detecting a load and is hereinafter called a current detection voltage VICS.

The switch control circuit 10 includes a pin P1 from which a first driving voltage PRDRV1 is output, a pin P2 from which a second driving voltage PRDRV2 is output, a pin P3 from which the first gate voltage SRG1 is output, a pin P4 from which the second gate voltage SRG2 is output, a pin P5 to which the first drain voltage SRD1 is inputted, the pin P6 to which the current detection voltage VICS is inputted, a pin P7 to which a feedback voltage VFB is inputted, a pin P8 to which a compensator 40 is connected, a pin P9 to which the detection voltage VCS is inputted, a pin P10 to which a resistor RPWM for controlling a PWM threshold voltage PWM_VTH is connected, and a pin P11 to which a resistor RMIN for controlling a switching frequency is connected.

The switch control circuit 10 may detect at least one of non-zero voltage switching and an overcurrent by detecting the detection voltage VCS and the current detection voltage VICS.

The pin P5 is connected to the drain of the first synchronization rectification switch SR1 through a resistor R8. The pin P7 is connected to a node to which the two resistors RF1 and RF2 are connected. The output voltage Vo is divided by the two resistors RF1 and RF2, thereby generating the feedback voltage VFB.

The compensator 40, including a resistor R10, a capacitor C2, and a capacitor C3, is connected to the pin P8. The capacitor C3 is connected in parallel to the resistor R10 and the capacitor C2 that are connected in series. One electrode of the capacitor C2 and one electrode of the capacitor C3 are connected to the pin P8. One end of the resistor R10 is connected to the other end of the capacitor C2, and the other end of the resistor R10 and the other electrode of the capacitor C3 are connected to the ground on the secondary side.

The switch control circuit 10 generates an error voltage by amplifying a difference between the feedback voltage VFB and a predetermined reference voltage. The error voltage is compensated for by the compensator 40, thereby generating a control voltage VCOMP.

The switch control circuit 10 determines modulation mode based on the result of a comparison between the control voltage VCOMP and the PWM threshold voltage PWM_VTH determined by the resistor RPWM.

The switch control circuit 10 generates an oscillation control signal VSAW using a current controlled by the resistor RMIN and generates first and second clock signals CLK1 and CLK2 using the oscillation control signal VSAW and the control voltage VCOMP in PFM mode. For example, the switch control circuit 10 may generate the first clock signal CLK1 of a high level during a period from a point of time at which the oscillation control signal VSAW starts to increase to a point of time at which the oscillation control signal VSAW reaches the control voltage VCOMP and generate the first clock signal CLK1 of a low level during the same period as the period in which the first clock signal CLK1 is a high level. The switch control circuit 10 may generate the second clock signal CLK2 having a phase reversed from the phase of the first clock signal CLK1.

The switch control circuit 10 generates the first and the second clock signals CLK1 and CLK2 using the oscillation control signal VSAW, a PWM threshold voltage PWM_VTH, and a PWM reference voltage PWM_VR in PWM mode. For example, the switch control circuit 10 generates the first clock signal CLK1 of a high level during a period from a first point of time at which the oscillation control signal VSAW rises and reaches the PWM reference voltage PWM_VR to a second point of time at which the oscillation control signal VSAW reaches the PWM threshold voltage PWM_VTH. The switch control circuit 10 generates the first clock signal CLK1 of a low level during a period from the second point of time to a point of time at which the oscillation control signal VSAW reaches the PWM reference voltage PWM_VR in a next cycle. The switch control circuit 10 generates the second clock signal CLK2 of a high level during the same period as the period in which the first clock signal CLK1 is a high level from the second point of time and decreases the high level of the second clock signal CLK2 to a low level. The switch control circuit 10 generates the second clock signal CLK2 of a low level from a third point of time at which the second clock signal CLK2 falls to a fourth point of time at which the oscillation control signal VSAW reaches the PWM threshold voltage PWM_VTH in a next cycle.

The switch control circuit 10 controls the switching operations of the first and the second switches Q1 and Q2 in response to the first and the second clock signals CLK1 and CLK2.

For example, the switch control circuit 10 turns on the first switch Q1 at a point of time delayed from the rising edge of the first clock signal CLK1 by a dead time and turns off the first switch Q1 at the falling edge of the first clock signal CLK1. The switch control circuit 10 turns on the second switch Q2 at a point of time delayed from the rising edge of the second clock signal CLK2 by a dead time and turns off the second switch Q2 at the falling edge of the second clock signal CLK2.

The switch control circuit 10 turns on the first synchronization rectification switch SR1 in synchronization with the turn-on of the first switch Q1 and turns on the second synchronization rectification switch SR2 in synchronization with the turn-on of the second switch Q2. The switch control circuit 10 maintains each of the first and the second synchronization rectification switches SR1 and SR2 during a predetermined on period and turns off it.

For example, the switch control circuit 10 may determine the on period of each of the first and the second synchronization rectification switches SR1 and SR2 in a current cycle based on a conduction period in the immediately previous switching cycle of each of the first and the second synchronization rectification switches SR1 and SR2.

An on period in a current cycle may be determined by subtracting a predetermined margin from a conduction period in the immediately previous switching cycle of each of the first and the second synchronization rectification switches SR1 and SR2. The conduction period in the immediately previous switching cycle of each of the first and the second synchronization rectification switches SR1 and SR2 means a period from a point of time at which each of the body diode BD3 and BD4 connected to the first and the second synchronization rectification switches SR1 and SR2 is conductive to a point of time at which each of the body diode BD3 and BD4 is blocked. A dead time is present between the on periods of each of the first and the second synchronization rectification switches SR1 and SR2.

Such a method of controlling the switching of the first and the second synchronization rectification switches SR1 and SR2 is only an example, and the present invention is not limited thereto.

Figure 2:
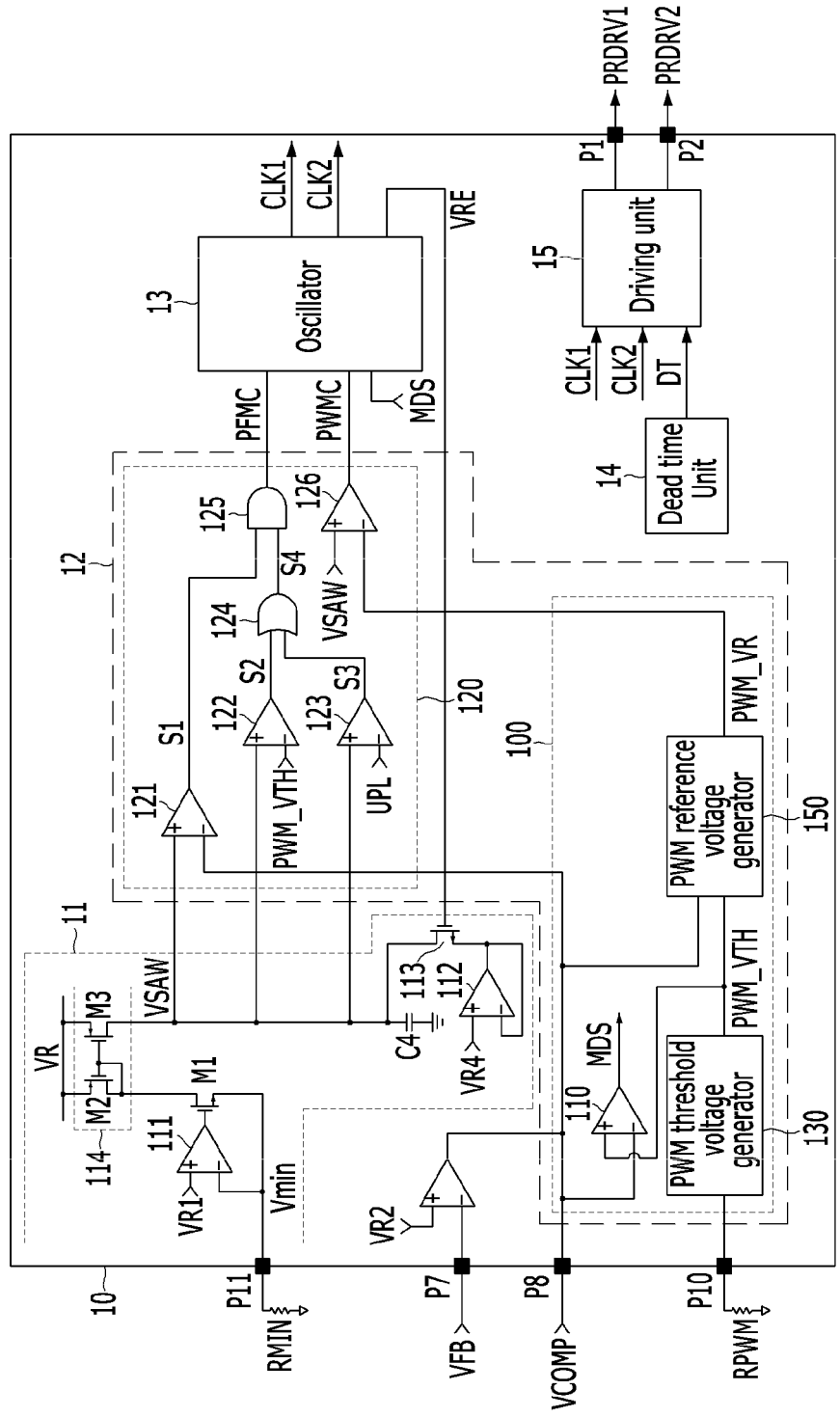
FIG. 2 is a diagram showing the configuration of part of a switch control circuit including the modulation mode control circuit according to an exemplary embodiment.

FIG. 2 is a diagram showing the configuration of part of a switch control circuit including the modulation mode control circuit according to an exemplary embodiment.

The switch control circuit 10 according to an exemplary embodiment includes an oscillation control signal generation unit 11, a modulation mode control circuit 12, an oscillator 13, a dead time unit 14, and a driving unit 15. The modulation mode control circuit 12 includes a modulation mode controller 100 and a control signal generation unit 120.

The oscillation control signal generation unit 11 generates the oscillation control signal VSAW for controlling a switching operation. Controlling the switching operation means controlling at least one of a switching frequency and a duty cycle.

The oscillation control signal generation unit 11 controls a current supplied to the resistor RMIN so that a voltage Vmin generated from the resistor RMIN becomes a reference voltage VR1, copies the current supplied to the resistor RMIN, and charges a capacitor C4 with the copied current. The voltage of the capacitor C4 is reset to an offset voltage in response to a reset signal VRE supplied by the oscillator 13. The voltage of the capacitor C4 becomes the oscillation control signal VSAW.

An operational amplifier 111 and a transistor M1 operate as a voltage-current converter. The output terminal of the operational amplifier 111 is connected to the gate of the transistor M1. The inverting terminal − of the operational amplifier 111 and the source of the transistor M1 are connected. The reference voltage VR1 is inputted to the non-inverting terminal + of the operational amplifier 111.

A current flows through the transistor M1 so that the voltage Vmin inputted to the inverting terminal − of the operational amplifier 111 becomes the reference voltage VR1 inputted to the non-inverting terminal + of the operational amplifier 111. The current flowing through the transistor M1 may vary depending on the resistor RMIN because the voltage Vmin is determined by the resistor RMIN and the current flowing through the transistor M1. The voltage Vmin is negative-fed back to the inverting terminal − of the operational amplifier 111. The transistor M1 is controlled in response to an output of the operational amplifier 111 based on the feedback.

A transistor M2 and a transistor M3 form a current mirror circuit 114. A current flowing through the transistor M2 is mirrored to the transistor M3. The gates of the transistor M2 and the transistor M3 are connected. The gate and drain of the transistor M2 are connected, and thus the transistor M2 operates like a diode. A voltage VR is supplied to the source of the transistor M2 and the source of the transistor M3.

The drain of the transistor M2 is connected to the drain of the transistor M1. Accordingly, a current flowing through the transistor M1 also flows through the transistor M2. The drain of the transistor M3 is connected to one electrode of the capacitor C4. When a current flowing through the transistor M1 is copied by the current mirror circuit 114 and supplied to the capacitor C4, the capacitor C4 is charged, thereby increasing the oscillation control signal VSAW.

A voltage VR4 is inputted to the non-inverting terminal + of an operational amplifier 112. The inverting terminal − of the operational amplifier 112, together with its output terminal, is connected to the source of a transistor 113. The reset signal VRE is supplied to the gate of the transistor 113. The drain of the transistor 113 is connected to one electrode of the capacitor C4. The inverting terminal − and output terminal of the operational amplifier 112 are connected, so the voltage VR4 becomes the output of the operational amplifier 112.

The reset signal VRE is generated in synchronization with any one of the first and the second clock signals CLK1 and CLK2. During the period in which the reset signal VRE is enabled, the oscillation control signal VSAW is maintained at the voltage VR4. The voltage VR4 is the offset voltage of the oscillation control signal VSAW. During the period in which the reset signal VRE is disabled, the oscillation control signal VSAW rises at a slope according to a current that flows through the transistor M1. For example, the reset signal VRE may be disabled in synchronization with a point of time at which the first clock signal CLK1 rises and may be enabled in synchronization with a point of time at which the second clock signal CLK2 rises.

The oscillation control signal generator 11 of FIG. 2 is an example in which the oscillation control signal VSAW is generated, and the invention is not limited to the example.

For example, the oscillation control signal VSAW may be generated by adding the current detection voltage VICS to the voltage of the capacitor C4. Furthermore, the oscillation control signal VSAW is an example of a signal for determining a switching frequency and a duty cycle, and the invention is not limited to the example.

The control signal generator 12 receives the control voltage VCOMP, the oscillation control signal VSAW, the PWM threshold voltage PWM_VTH, and the PWM reference voltage PWM_VR, generates a first control signal PFMC for determining a switching frequency based on the result of a comparison between the control voltage VCOMP and the oscillation control signal VSAW and the result of a comparison between the PWM threshold voltage PWM_VTH and the oscillation control signal VSAW, and generates a second control signal PWMC for determining a duty cycle based on the result of a comparison between the PWM reference voltage PWM_VR and the oscillation control signal VSAW.

The control signal generator 12 includes four comparators 121-123 and 126, an OR gate 124, and an AND gate 125.

When the input of the non-inverting terminal + of each of the four comparators 121-123 and 126 is equal to or higher than the input of the inverting terminal − thereof, each of the four comparators 121-123 and 126 outputs a high level. When the input of the non-inverting terminal + of each of the four comparators 121-123 and 126 is lower than the input of the inverting terminal − thereof, each of the four comparators 121-123 and 126 outputs a low level.

The comparator 121 outputs the result of a comparison between the control voltage VCOMP and the oscillation control signal VSAW. The comparator 121 includes an inverting terminal − to which the control voltage VCOMP is inputted and a non-inverting terminal + to which the oscillation control signal VSAW is inputted. The output S1 of the comparator 121 is inputted to the AND gate 125.

The comparator 122 outputs the result of a comparison between the PWM threshold voltage PWM_VTH and the oscillation control signal VSAW. The comparator 122 includes an inverting terminal − to which the PWM threshold voltage PWM_VTH is inputted and a non-inverting terminal + to which the oscillation control signal VSAW is inputted. The output S2 of the comparator 122 is inputted to the OR gate 124.

The comparator 123 outputs the result of a comparison between the limit voltage UPL and the oscillation control signal VSAW. The comparator 123 includes an inverting terminal − to which a limit voltage UPL is inputted and a non-inverting terminal + to which the oscillation control signal VSAW is inputted. The output S3 of the comparator 123 is inputted to the OR gate 124.

The comparator 126 outputs the result of a comparison between the PWM reference voltage PWM_VR and the oscillation control signal VSAW. The comparator 126 includes an inverting terminal − to which the PWM reference voltage PWM_VR is inputted and a non-inverting terminal + to which the oscillation control signal VSAW is inputted. The output of the comparator 126 is the second control signal PWMC. For example, the oscillator 13 may determine the duty cycle of the first switch Q1 and the second switch Q2 in response to the second control signal PWMC in PWM mode and generate the first and the second clock signals CLK1 and CLK2.

The OR gate 124 determines an output S4 based on the result of OR operation of the output of the comparator 122 and the output of the comparator 123 and outputs the output S4 to the AND gate 125. The limit voltage UPL is a voltage that limits a maximum switching frequency in PWM mode. Although the PWM threshold voltage PWM_VTH is higher than the limit voltage UPL, the output S4 of the OR gate 124 becomes a high level at a point of time at which the oscillation control signal VSAW reaches the limit voltage UPL.

The AND gate 125 performs AND operation on the output of the comparator 121 and the output of the OR gate 124 and outputs the result of the AND operation. The output of the AND gate 125 is the first control signal PFMC.

The modulation mode controller 100 compares the PWM threshold voltage PWM_VTH, determined based on the mode threshold resistor RPWM, with the control voltage VCOMP, determines modulation mode, and generates the PWM reference voltage PWM_VR using the PWM threshold voltage PWM_VTH and the control voltage VCOMP. The modulation mode controller 100 includes a mode selector 110, a PWM threshold voltage generator 130, and a PWM reference voltage generator 150.

The mode selector 110 outputs the result of a comparison between the control voltage VCOMP and the PWM threshold voltage PWM_VTH. The mode selector 110 includes an inverting terminal − to which the control voltage VCOMP is inputted and a non-inverting terminal + to which the PWM threshold voltage PWM_VTH is inputted and generates a mode signal MDS based on a result of the comparison. The mode signal MDS is transferred to the oscillator 13.

When the input of the inverting terminal − of the mode selector 110 is equal to or smaller than the input of the non-inverting terminal + the mode selector 110, the mode selector 110 outputs a high level. When the input of the inverting terminal − of the mode selector 110 is greater than the input of the non-inverting terminal + the mode selector 110, the mode selector 110 outputs a low level. Accordingly, when the control voltage VCOMP is the PWM threshold voltage PWM_VTH or less, the mode selector 110 generates the mode signal MDS of a high level indicative of PWM mode. When the control voltage VCOMP is higher than the PWM threshold voltage PWM_VTH, the mode selector 110 generates the mode signal MDS of a low level indicative of PFM mode.

If a load is reduced, the feedback voltage VFB is increased due to an increase of an output voltage Vo. Accordingly, the control voltage VCOMP is reduced. In an exemplary embodiment, in a light load condition, the control voltage VCOMP becomes the PWM threshold voltage PWM_VTH or lower, so modulation mode switches from PFM mode to PWM mode. In this case, the PWM threshold voltage PWM_VTH is determined by the resistor RPWM. The PWM reference voltage PWM_VR that determines a duty cycle in PWM mode may also be controlled by the resistor RPWM.

The PWM threshold voltage generator 130 and the PWM reference voltage generator 150 according to an exemplary embodiment are described below with reference to FIGS. 3 and 4.

Figure 3:
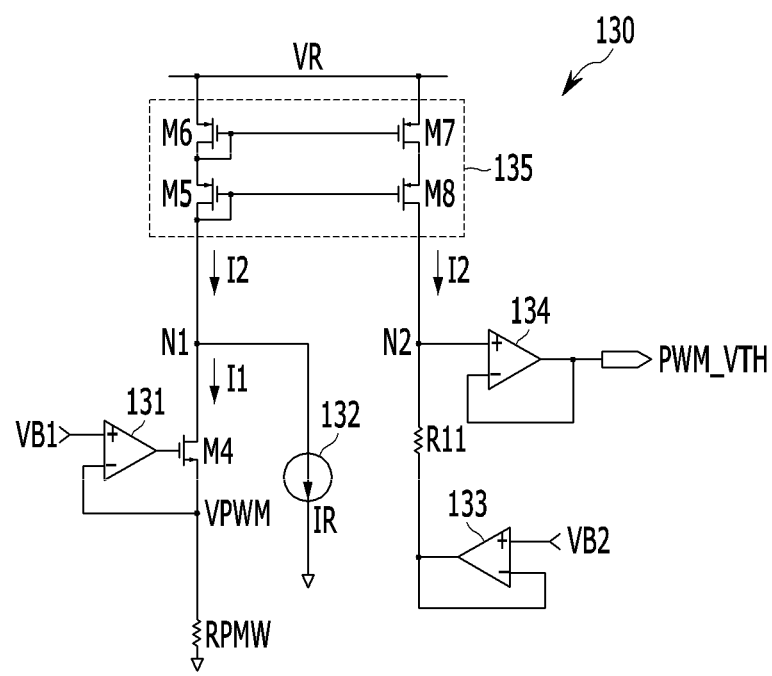
FIG. 3 is a diagram showing a PWM threshold voltage generator according to an exemplary embodiment.

FIG. 3 is a diagram showing the PWM threshold voltage generator according to an exemplary embodiment.

As shown in FIG. 3, the PWM threshold voltage generator 130 includes three operational amplifiers 131, 133, and 134, a current source 132, a transistor M4, a current mirror circuit 135, and a resistor R11.

Four transistors M5-M8 form the current mirror circuit 135. The gates and drains of the two transistors M5 and M6 that are connected in series are connected, and thus the two transistors M5 and M6 operate like a diode. The two transistors M7 and M8 are connected in series. The gate of the transistor M6 and the gate of the transistor M7 are connected. The gate of the transistor M5 and the gate of the transistor M8 are connected. The voltage VR is supplied to the sources of the transistor M6 and the transistor M7. The drain of the transistor M5 is connected to a node N1, and the drain of the transistor M8 is connected to a node N2. A current I2 is the sum of a current I1 and a current IR. The current I2 is mirrored by the current mirror circuit 135 and supplied to the resistor R11.

The operational amplifier 131 and the transistor M4 operate as a voltage-current converter. The output terminal of the operational amplifier 131 is connected to the gate of the transistor M4. The inverting terminal − of the operational amplifier 131 and the source of the transistor M4 are connected. A voltage VB1 is inputted to the non-inverting terminal + of the operational amplifier 131. The drain of the transistor M4 is connected to the node N1.

The current I1 flows through the transistor M4 so that a voltage VPWM inputted to the inverting terminal − of the operational amplifier 131 becomes the same as the voltage VB1 inputted to the non-inverting terminal + of the operational amplifier 131. A current flowing through the transistor M4 may vary depending on the resistor RPWM because the voltage VPWM is determined by the resistor RPWM and the current I1.

The voltage VPWM of the resistor RPWM is negative-fed back to the inverting terminal − of the operational amplifier 131. The operational amplifier 131 controls the transistor M4 based on an output according to the feedback. Accordingly, the current I1 is controlled so that it has a value (VB1/RPWM) obtained by dividing the voltage VB1 by the resistor RPWM.

The current source 132 is connected to the node N1 and sinks the current IR. If the resistor RPWM is not connected to the pin P10, the current source 132 is connected to the node N1 in order to form a bleeding current path. That is, although the resistor RPWM is not connected to the pin P10, the current I2 is determined by the current IR, mirrored by the current mirror circuit 135, and supplied to the resistor R11.

The resistor R11 is connected between a node N2 and the output terminal of the operational amplifier 133. The output terminal and inverting terminal − of the operational amplifier 133 are connected, and thus the operational amplifier 133 operates as a buffer. A voltage VB2 inputted to the non-inverting terminal + of the operational amplifier 133 is a voltage at the output terminal of the operational amplifier 133. Accordingly, a voltage at the node N2 is a voltage (I2*R11+VB2) obtained by adding the voltage VB2 to a voltage obtained by multiplying the current I2 and the resistor R11. The voltage VB2 is the offset voltage of the PWM threshold voltage PWM_VTH.

The output terminal and inverting terminal − of the operational amplifier 134 are connected, and thus the operational amplifier 134 operates as a buffer. The non-inverting terminal + of the operational amplifier 134 is connected to the node N2. The operational amplifier 134 outputs the voltage of the node N2 as the PWM threshold voltage PWM_VTH. The PWM threshold voltage PWM_VTH may be represented as in Equation 1 below.

$$PWM\_VTH = I2*R11 + VB2 = (IR + VB1/RPWM)*R11 + VB2 \quad \text{[Equation 1]}$$

The PWM threshold voltage PWM_VTH may be controlled by controlling the resistor RPWM because the current IR, the voltage VB1, the voltage VB2, and the resistor R11 have fixed values within the PWM threshold voltage generator 130.

In order for the current VB1/RPWM to flow through the resistor RPWM, the gain of the operational amplifier 131 needs to be set sufficiently high.

Figure 4:
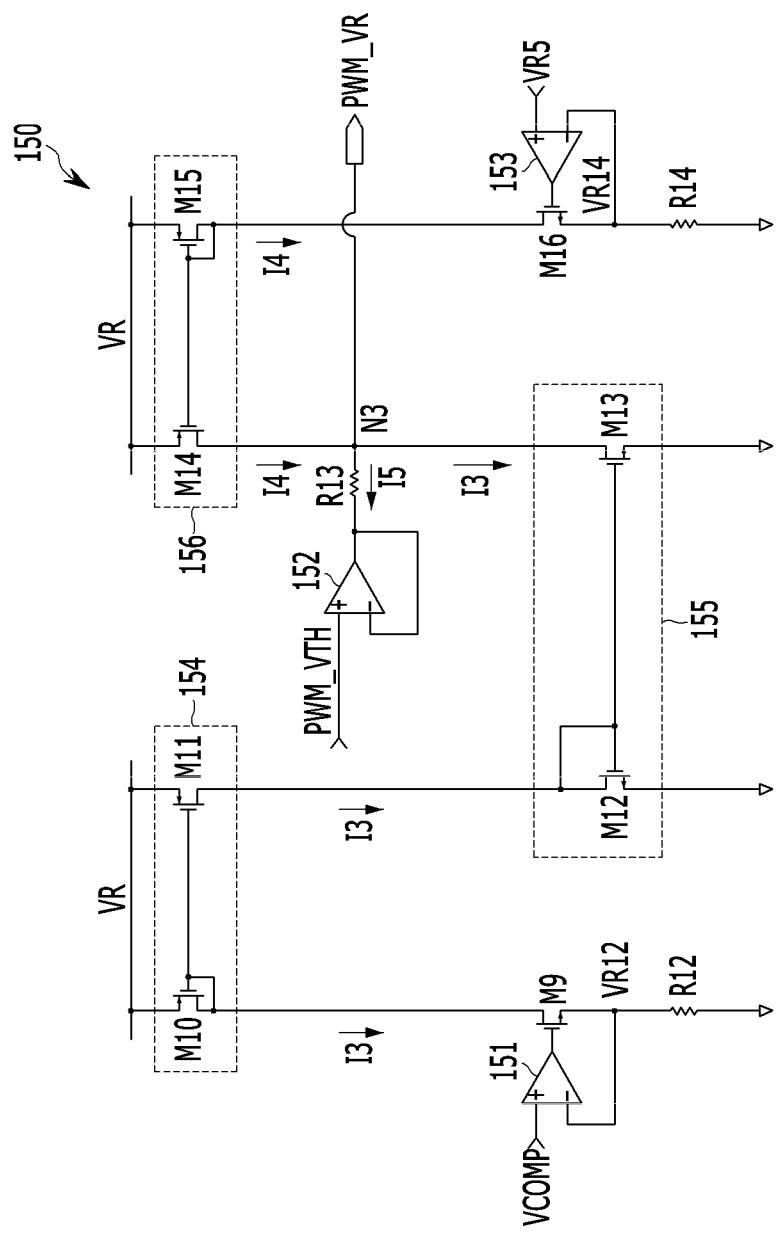
FIG. 4 is a diagram showing a PWM reference voltage generator according to an exemplary embodiment.

FIG. 4 is a diagram showing the PWM reference voltage generator according to an exemplary embodiment.

As shown in FIG. 4, the PWM reference voltage generator 150 includes three operational amplifiers 151-153, three current mirror circuits 154-156, two transistors M9 and M16, and three resistors R12-R14.

The operational amplifier 151 and the transistor M9 operate as a voltage-current converter. The output terminal of the operational amplifier 151 is connected to the gate of the transistor M9. The inverting terminal − of the operational amplifier 151 and the source of the transistor M9 are connected. The control voltage VCOMP is inputted to the non-inverting terminal + of the operational amplifier 151.

The resistor R12 is connected to the inverting terminal − of the operational amplifier 151. A current I3 flows through the transistor M9 so that a voltage VR12 inputted to the inverting terminal − of the operational amplifier 151 is the same as the control voltage VCOMP inputted to the non-inverting terminal + of the operational amplifier 151. The current I3 is a value (VCOM/R12) obtained by dividing the control voltage VCOM by the resistor R12.

The current mirror circuit 154 mirrors the current I3 flowing through the transistor M9 and supplies the mirrored current to the current mirror circuit 155. The current mirror circuit 154 includes two transistors M10 and M11. The gate and drain of the transistor M10 are connected, and thus the transistor M10 operates likes a diode. The gate of the transistor M10 and the gate of the transistor M11 are connected. The voltage VR is supplied to the source of the transistor M10 and the source of the transistor M11. The drain of the transistor M10 is connected to the drain of the transistor M9.

The current I3 mirrored by the current mirror circuit 154 is mirrored again by the current mirror circuit 155. The current mirror circuit 155 includes two transistors M12 and M13. The gate and drain of the transistor M12 are connected, and thus the transistor M12 operates like a diode. The gate of the transistor M12 and the gate of the transistor M13 are connected. The source of the transistor M12 and the source of the transistor M13 are connected to the ground. The drain of the transistor M12 is connected to the drain of the transistor M11. The drain of the transistor M13 is connected to a node N3.

The output terminal and inverting terminal − of the operational amplifier 152 are connected, and thus the operational amplifier 152 operates as a buffer. The PWM threshold voltage PWM_VTH is inputted to the non-inverting terminal + of the operational amplifier 152. The operational amplifier 152 outputs the PWM threshold voltage PWM_VTH. The resistor R13 is connected between the node N3 and the output terminal of the operational amplifier 152.

The operational amplifier 153 and the transistor M16 operate as a voltage-current converter. The output terminal of the operational amplifier 153 is connected to the gate of the transistor M16. The inverting terminal − of the operational amplifier 153 and the source of the transistor M16 are connected. A reference voltage VR5 is inputted to the non-inverting terminal + of the operational amplifier 153.

The resistor R14 is connected to the inverting terminal − of the operational amplifier 153. A current I4 flows through the transistor M16 so that a voltage VR14 inputted to the inverting terminal − of the operational amplifier 153 is the same as the voltage VR5 inputted to the non-inverting terminal + of the operational amplifier 153. The current I4 is a value (VR5/R12) obtained by dividing the reference voltage VR5 by the resistor R14.

The current mirror circuit 156 mirrors the current I4 flowing through the transistor M16. The current mirror circuit 156 includes two transistors M14 and M15. The gate and drain of the transistor M15 are connected, and thus the transistor M15 operates like a diode. The gate of the transistor M14 and the gate of the transistor M15 are connected. The voltage VR is supplied to the source of the transistor M14 and the source of the transistor M15. The drain of the transistor M15 is connected to the drain of the transistor M16.

The current I4 mirrored by the current mirror circuit 156 is the sum of the current I3 and a current I5. The current I5 is a value obtained by dividing a difference between the voltage of the node N3 and the PWM threshold voltage PWM_VTH by the resistor R13. The voltage of the node N3 is the PWM reference voltage PWM_VR, so the current I5 may be represented as in Equation 2 below.

$$I5=(PWM\_VR-PWM\_VTH)/R13 \quad \text{[Equation 2]}$$

The current I4 is VR5/R14, the current I3 is VCOMP/R12, and the current I4 is I3+I5, which may be summarized through Equation 3 below.

$$VR5/R14=VCOMP/R12+(PWM\_VR-PWM\_VTH)/R13 \quad \text{[Equation 3]}$$

In Equation 3, assuming that all the pieces of resistance R12, R13 and R14 are the same, Equation 3 may be summarized as in Equation 4.

$$VR5=VCOMP+PWM\_VR-PWM\_VTH \quad \text{[Equation 4]}$$

The PWM reference voltage PWM_VR may be represented as in Equation 5 based on Equation 4.

$$PWM\_VR=PWM\_VTH-VCOMP+VR5 \quad \text{[Equation 5]}$$

In Equation 5, the reference voltage VR5 is a fixed value. As described above, the PWM reference voltage PWM_VR according to an exemplary embodiment is determined by the PWM threshold voltage PWM_VTH and the control voltage VCOMP. If the PWM threshold voltage PWM_VTH is changed by controlling the resistor RPWM, the PWM reference voltage PWM_VR is also changed. Furthermore, if the control voltage VCOMP varies depending on a load, the PWM reference voltage PWM_VR also varies. For example, if the control voltage VCOMP is reduced, the PWM reference voltage PWM_VR is increased.

The oscillator 13 receives the first control signal PFMC, the second control signal PWMC, and the mode signal MDS and generates the first and the second clock signals CLK1 and CLK2 using the first control signal PFMC and the second control signal PWMC in modulation mode based on the mode signal MDS.

In PFM mode, the oscillator 13 generates the first and the second clock signals CLK1 and CLK2 in response to the first control signal PFMC. For example, the oscillator 13 may decrease the first clock signal CLK1 and increase the second clock signal CLK2 in synchronization with the rising edge of the first control signal PFMC and may increase the first clock signal CLK1 and decrease the second clock signal CLK2 at a point of time after a lapse of the period in which the first clock signal CLK1 is enabled in an immediately previous switching cycle from a point of time at which the first control signal PFMC rises. When the oscillator 13 generates the first and the second clock signals CLK1 and CLK2 in PFM mode, the second control signal PWMC does not participate in the generation of the first and the second clock signals CLK1 and CLK2.

In PWM mode, the oscillator 13 generates the first and the second clock signals CLK1 and CLK2 in response to the first control signal PFMC and the second control signal PWMC. For example, the oscillator 13 may increase the first clock signal CLK1 in synchronization with the rising edge of the second control signal PWMC, may decrease the first clock signal CLK1 and increase the second clock signal CLK2 in synchronization with the rising edge of the first control signal PFMC, and may decrease the second clock signal CLK2 at a point of time after the period in which the first clock signal CLK1 is enabled from a point of time at which the second clock signal CLK2 rises.

The oscillator 13 may count a period from a point of time at which the oscillation control signal VSAW starts to increase to a point of time at which the oscillation control signal VSAW reaches the PWM reference voltage PWM_VR in PWM mode. The oscillator 13 may decrease the reset signal VRE to a low level to control the oscillation control signal VSAW to start rising at a point of time at which the counted period elapses from a point of time at which the second clock signal CLK2 falls.

The driving unit 15 generates the first and the second driving voltages PRDRV1 and PRDRV2 based on the first and the second clock signals CLK1 and CLK2 and the dead times of the first and the second switches Q1 and Q2.

The driving unit 15 may increase the first driving voltage PRDRV1 to a high level at a point of time delayed from the rising edge of the first clock signal CLK1 by a dead time and may decrease the second driving voltage PRDRV2 to a low level at the falling edge of the second clock signal CLK2. The driving unit 15 may increase the second driving voltage PRDRV2 to a high level at a point of time delayed from the rising edge of the second clock signal CLK2 by a dead time and may decrease the first driving voltage PRDRV1 to a low level at the falling edge of the first clock signal CLK2.

The dead time unit 14 transfers information DT about a dead time to the driving unit 15.

A modulation mode control method according to an exemplary embodiment is described below with reference to FIG. 5.

Figure 5:
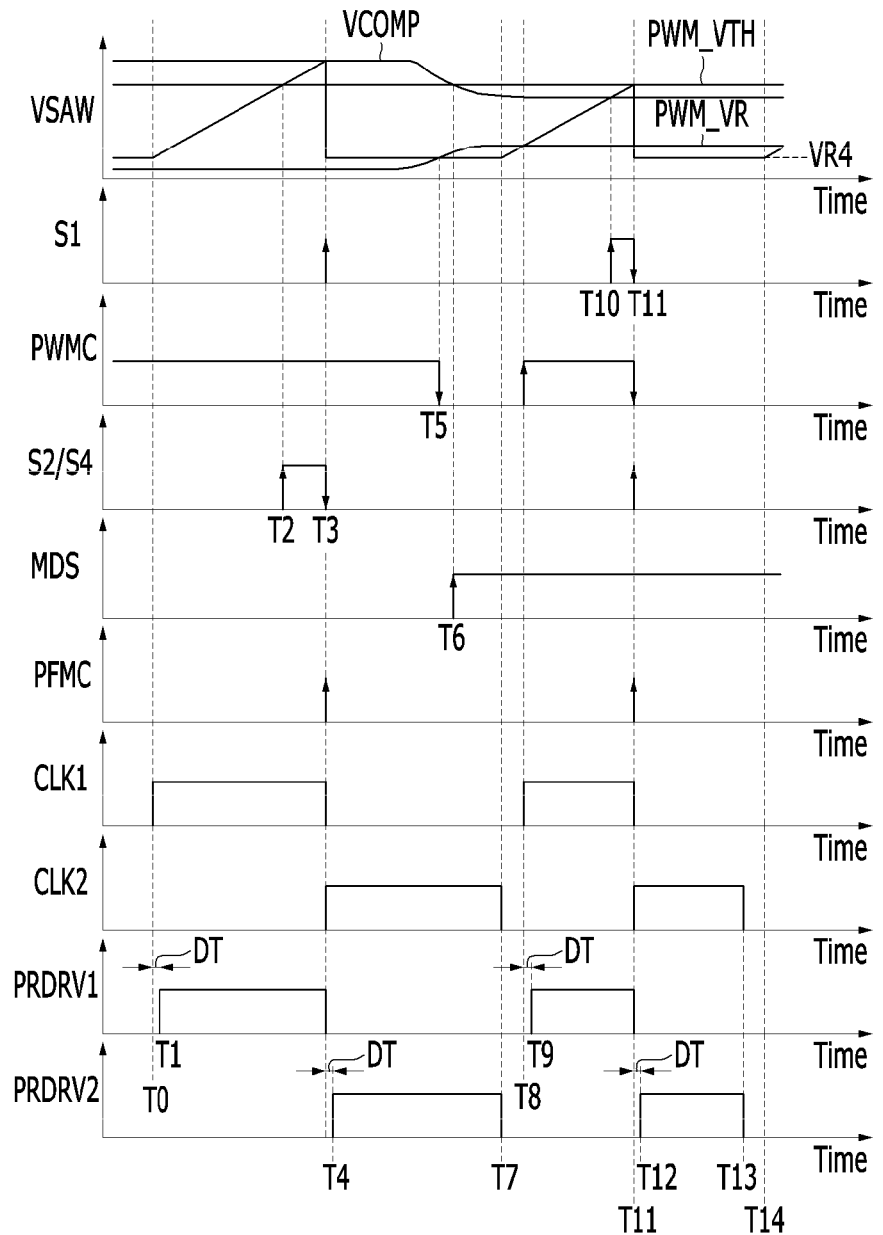
FIG. 5 is a diagram showing signals according to an exemplary embodiment.

FIG. 5 is a diagram showing signals according to an exemplary embodiment.

At a point of time T0, the first clock signal CLK1 rises and the reset signal VRE falls to a low level. Accordingly, the transistor 113 is turned off, and the oscillation control signal VSAW starts to increase. The first driving voltage PRDRV1 rises to a high level at a point of time T1 at which the dead time DT has elapsed from the point of time T0.

At a point of time T2, the increasing oscillation control signal VSAW reaches the PWM threshold voltage PWM_VTH, the output S2 of the comparator 122 rises to a high level, and the output S4 of the OR gate 124 also rises to a high level.

At a point of time T3, the increasing oscillation control signal VSAW reaches the control voltage VCOMP, the output S1 of the comparator 121 rises to a high level, and the first control signal PFMC, that is, the output of the AND gate 125, also rises to a high level. The reset signal VRE becomes a high level in synchronization with the point of time T3, the transistor 113 is turned on, and the oscillation control signal VSAW falls due to the discharge of the capacitor C4. The output S1 of the comparator 121, the output S2 of the comparator 122, and the output S4 of the OR gate 124 falls to a low level due to the decrease of the oscillation control signal VSAW.

As shown in FIG. 5, the output S1 of the comparator 121 and the first control signal PFMC may fall right after they rise and may be generated in a pulse form.

The oscillator 13 decreases the first clock signal CLK1 and increases the second clock signal CLK2 in synchronization with the pulse of the first control signal PFMC at the point of time T3. The first driving voltage PRDRV1 falls in response to the falling of the first clock signal CLK1. The second driving voltage PRDRV2 rises to a high level at a point of time T4 at which the dead time DT has elapsed from the point of time T3 at which the second clock signal CLK2 rises.

The control voltage VCOMP decreases and the PWM reference voltage PWM_VR increases due to a reduction of a load. At a point of time T5, the PWM reference voltage PWM_VR increases and reaches the control voltage VCOMP, and the second control signal PWMC falls to a low level.

At a point of time T6 at which the decreasing control voltage VCOMP reaches the PWM threshold voltage PWM_VTH, the mode signal MDS indicative of PWM mode rises to a high level.

At a point of time T7 at which the same period as the period T0-T3 in which the first clock signal CLK1 is a high level has elapsed from the point of time T3, the oscillator 13 decreases the second clock signal CLK2. At the point of time T7, the reset signal VRE falls to a low level and the transistor 113 is turned off. In response thereto, the oscillation control signal VSAW starts to increase from the point of time T7.

At a point of time T8, the increasing oscillation control signal VSAW reaches the PWM reference voltage PWM_VR, and the second control signal PWMC, that is, the output of the comparator 126, rises to a high level. Accordingly, the oscillator 13 increases the first clock signal CLK1 to a high level in synchronization with the rising edge of the second control signal PWMC. The first driving voltage PRDRV1 rises a high level at a point of time T9 at which the dead time DT has elapsed from the point of time T8.

At a point of time T10, the oscillation control signal VSAW reaches the control voltage VCOMP, and the output S1 of the comparator 121 rises to a high level. At a point of time T11, the oscillation control signal VSAW reaches the PWM threshold voltage PWM_VTH, the output S2 of the comparator 122 rises to a high level, and the output S4 of the OR gate 124 also rises to a high level. Accordingly, the first control signal PFMC, that is, the output of the AND gate 125, also rises to a high level.

The reset signal VRE becomes a high level in synchronization with the point of time T11, and the transistor 113 is turned on. The oscillation control signal VSAW falls due to the discharge of the capacitor C4. When the oscillation control signal VSAW falls, the output S1 of the comparator 121, the output S2 of the comparator 122, the output S4 of the OR gate 124, and the first control signal PFMC fall to a low level.

As shown in FIG. 5, the output S2 of the comparator 122, the output S4 of the OR gate 124, and the first control signal PFMC may fall right after they rise and may be generated in a pulse form.

The oscillator 13 decreases the first clock signal CLK1 and increases the second clock signal CLK2 in synchronization with the pulse of the first control signal PFMC at the point of time T11. When the first clock signal CLK1 falls, the first driving voltage PRDRV1 falls. The second driving voltage PRDRV2 rises to a high level at a point of time T12 at which the dead time DT has elapsed from the point of time T11 at which the second clock signal CLK2 rises.

The oscillator 13 decreases the second clock signal CLK2 at a point of time T13 at which the same period as the period T8-T11 in which the first clock signal CLK1 is a high level has elapsed from the point of time T11. When the second clock signal CLK2 falls, the second driving voltage PRDRV2 falls.

At a point of time T14 at which the period T7-T8 has elapsed from the point of time T13, the oscillator 13 decreases the reset signal VRE to a low level. The transistor 113 is turned off in response to the reset signal VRE, and the oscillation control signal VSAW starts to increase from the point of time T14.

As described above, in PWM mode, a switching frequency is determined at a point of time at which the oscillation control signal VSAW has reached the PWM threshold voltage PWM_VTH. Accordingly, the switching frequency becomes constant. Furthermore, a duty cycle is determined by the PWM reference voltage PWM_VR.

As described above, the oscillation control signal VSAW may be generated by adding the current detection voltage VICS to a voltage charged in the capacitor C4.

Figure 6:
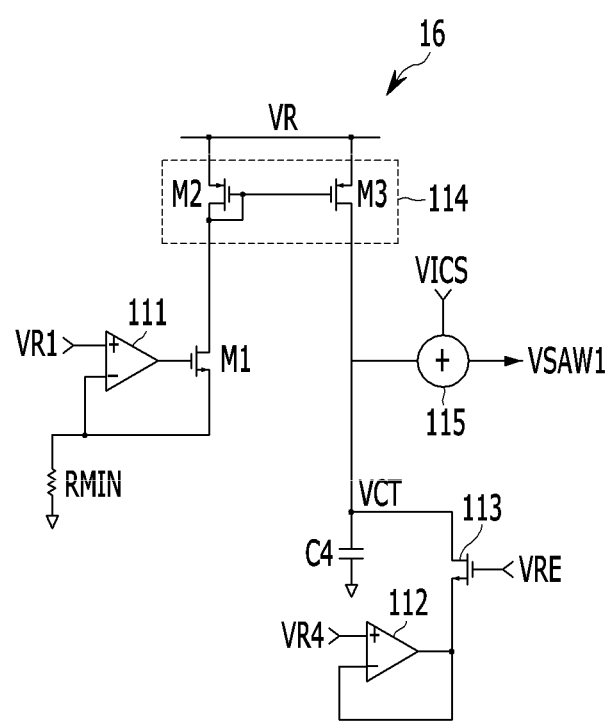
FIG. 6 is a diagram showing an oscillation control signal generator according to another exemplary embodiment.

FIG. 6 is a diagram showing the oscillation control signal generator according to another exemplary embodiment.

The oscillation control signal generator 16 of FIG. 6 further includes an adder 115 compared to the oscillation control signal generator 11 of FIG. 2. The remaining elements are the same as those of the oscillation control signal generator 11 of FIG. 2, and a description thereof is omitted.

The adder 115 generates an oscillation control signal VASW1 by adding the current detection voltage VICS and a voltage VCT charged in the capacitor C4.

A modulation mode control method using the oscillation control signal VASW1 is the same as that described above. The oscillation control signal VSAW1 is inputted to the non-inverting terminals + of the four comparators 121, 122, 123, and 126 and is compared with the control voltage VCOMP, the PWM threshold voltage PWM_VTH, the limit voltage UPL, and the PWM reference voltage PWM_VR inputted to the inverting terminals − of the four comparators 121, 122, 123, and 126, respectively.

Figure 7:
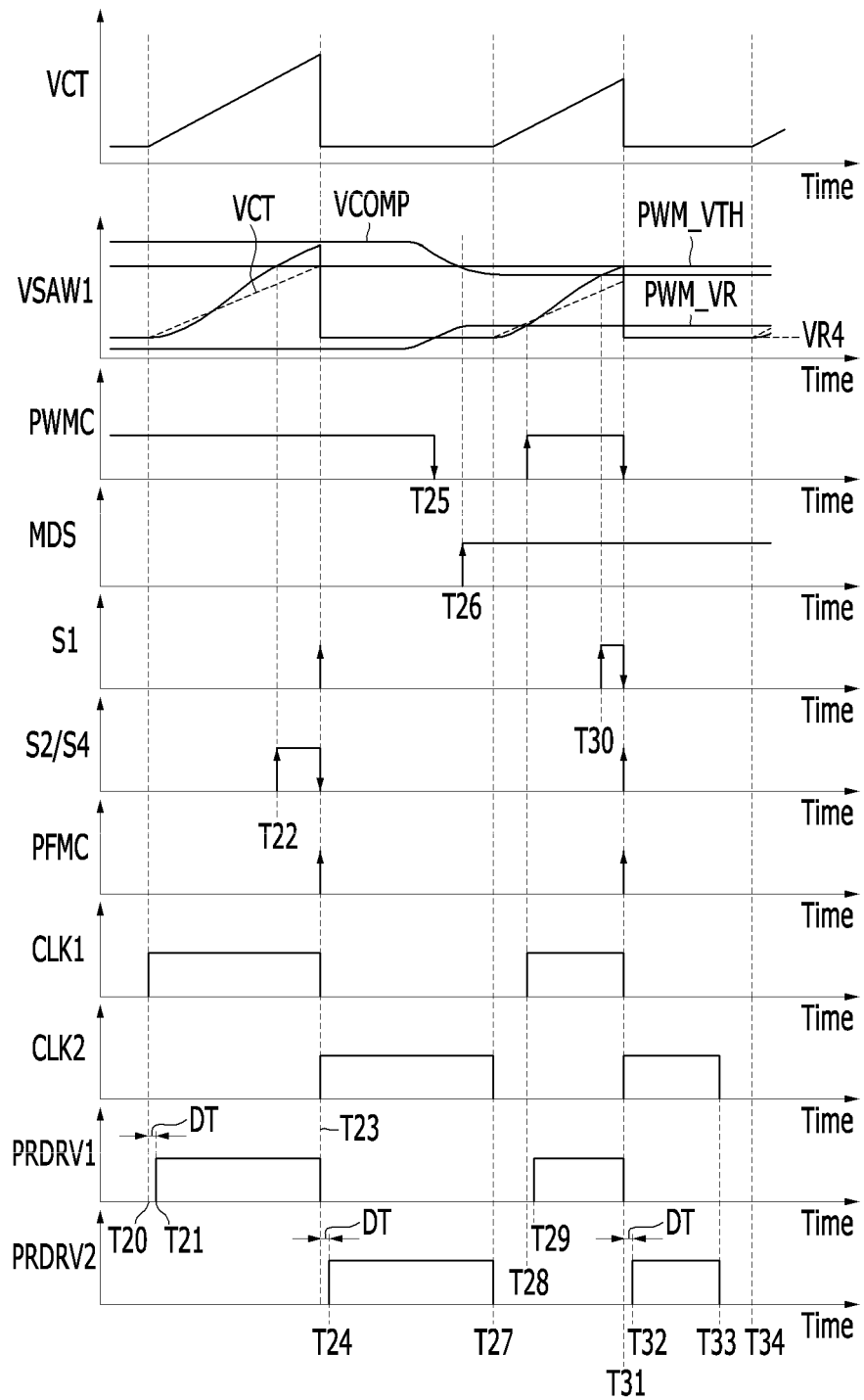
FIG. 7 is a diagram showing signals according to another exemplary embodiment.

FIG. 7 is a diagram showing signals according to another exemplary embodiment.

At a point of time T20, the first clock signal CLK1 rises, and the reset signal VRE becomes a low level. Accordingly, the transistor 113 is turned off, and the voltage VCT starts to increase. When the voltage VCT increases, the oscillation control signal VSAW1 also starts to increase. The first driving voltage PRDRV1 rises to a high level at a point of time T21 at which the dead time DT has elapsed from the point of time T20.

At a point of time T22, the increasing oscillation control signal VSAW1 reaches the PWM threshold voltage PWM_VTH, the output S2 of the comparator 122 rises to a high level, and the output S4 of the OR gate 124 also rises to a high level.

At a point of time T23, the increasing oscillation control signal VSAW1 reaches the control voltage VCOMP, the output S1 of the comparator 121 rises to a high level, and the first control signal PFMC, that is, the output of the AND gate 125, also rises to a high level. The reset signal VRE becomes a high level in synchronization with the point of time T23. Accordingly, the transistor 113 is turned on, and the oscillation control signal VSAW1 and the voltage VCT fall due to the discharge of the capacitor C4. When the oscillation control signal VSAW1 falls, the output S1 of the comparator 121, the output S2 of the comparator 122, and the output S4 of the OR gate 124 falls to a low level.

As shown in FIG. 7, the output S1 of the comparator 121 and the first control signal PFMC fall right after they rise and may be generated in a pulse form.

The oscillator 13 decreases the first clock signal CLK1 and increases the second clock signal CLK2 in synchronization with the pulse of the first control signal PFMC of the point of time T23. When the first clock signal CLK1 falls, the first driving voltage PRDRV1 falls. The second driving voltage PRDRV2 rises to a high level at a point of time T24 at which the dead time DT has elapsed from the point of time T23 at which the second clock signal CLK2 rises.

The control voltage VCOMP decreases and the PWM reference voltage PWM_VR increases due to a reduction of a load. At a point of time T25, the PWM reference voltage PWM_VR increases and reaches the control voltage VCOMP, and the second control signal PWMC falls to a low level.

At a point of time T26 at which the decreasing control voltage VCOMP reaches the PWM threshold voltage PWM_VTH, the mode signal MDS indicative of PWM mode rises to a high level.

The oscillator 13 decreases the second clock signal CLK2 at a point of time T27 at which the same period as the period T20-T23 in which the first clock signal CLK1 is a high level has elapsed from the point of time T23. At the point of time T27, the reset signal VRE falls to a low level and thus the transistor 113 is turned off. Accordingly, the oscillation control signal VSAW1 and the voltage VCT start to rise from the point of time T27.

At a point of time T28, the increasing oscillation control signal VSAW1 reaches the PWM reference voltage PWM_VR. The second control signal PWMC, that is, the output of the comparator 126, rises to a high level. Accordingly, the oscillator 13 increases the first clock signal CLK1 to a high level in synchronization with the rising edge of the second control signal PWMC. At a point of time T29 at which the dead time DT has elapsed from the point of time T28, the first driving voltage PRDRV1 rises to a high level.

At a point of time T30, the oscillation control signal VSAW1 reaches the control voltage VCOMP, and thus the output S1 of the comparator 121 rises to a high level. At a point of time T31, the oscillation control signal VSAW1 reaches the PWM threshold voltage PWM_VTH, the output S2 of the comparator 122 rises to a high level, and the output S4 of the OR gate 124 also rises to a high level. Accordingly, the first control signal PFMC, that is, the output of the AND gate 125, also rises to a high level.

The reset signal VRE becomes a high level in synchronization with the point of time T31. Accordingly, the transistor 113 is turned on, and the oscillation control signal VSAW1 falls due to the discharge of the capacitor C4. When the oscillation control signal VSAW1 falls, the output S1 of comparator 121, the output S2 of the comparator 122, the output S4 of the OR gate 124, and the first control signal PFMC fall to a low level.

As shown in FIG. 7, the output S2 of the comparator 122, the output S4 of the OR gate 124, and the first control signal PFMC may fall right after they rise and may be generated in a pulse form.

The oscillator 13 decreases the first clock signal CLK1 and increases the second clock signal CLK2 in synchronization with the pulse of the first control signal PFMC of the point of time T31. When the first clock signal CLK1 falls, the first driving voltage PRDRV1 falls. The second driving voltage PRDRV2 rises to a high level at a point of time T32 at which the dead time DT has elapsed from the point of time T31 at which the second clock signal CLK2 rises.

The oscillator 13 decreases the second clock signal CLK2 at a point of time T33 at which the same period as the period T28-T31 in which the first clock signal CLK1 is a high level has elapsed from the point of time T31.

At a point of time T34 at which the period T27-T28 has elapsed from the point of time T33, the oscillator 13 decreases the reset signal VRE to a low level. The transistor 113 is turned off in response to the reset signal VRE. The oscillation control signal VSAW1 starts to increase from the point of time T34.

As in the previous exemplary embodiment, in PWM mode, based on a point of time at which the oscillation control signal VSAW1 reaches the PWM threshold voltage PWM_VTH, a switching frequency is determined and thus become constant. Furthermore, a duty cycle is determined by the PWM reference voltage PWM_VR.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: resonant converter
Q1: first switch
Q2: second switch
20: transformer
30: gate driving circuit
SR1: first synchronization rectification switch
SR2: second synchronization rectification switch
10: switch control circuit
11, 16: oscillation control signal generator
12: modulation mode control circuit
13: oscillator
14: dead time unit
15: driving unit
100: modulation mode controller
110: comparator
120: control signal generation unit
130: PWM threshold voltage generator
150: PWM reference voltage generator

What is claimed is:

1. A modulation mode control circuit, comprising:
   a modulation mode controller configured to select a modulation mode based on a result of a comparison between a control voltage and a predetermined PWM threshold voltage and generate a PWM reference voltage using the PWM threshold voltage and the control voltage; and
   a control signal generation unit configured to generate a first control signal based on a result of a comparison between an oscillation control signal for controlling a switching frequency and the control voltage and a result of a comparison between the oscillation control signal and the PWM threshold voltage, and generate a second control signal based on a result of a comparison between the oscillation control signal and the PWM reference voltage.

2. The modulation mode control circuit of claim 1, wherein the modulation mode controller comprises:

a comparator configured to compare the PWM threshold voltage with the control voltage;

a PWM threshold voltage generator configured to control the PWM threshold voltage in response to a first resistor that is externally connected; and a PWM reference voltage generator configured to generate the PWM reference voltage based on a difference between the PWM threshold voltage and the control voltage.

3. The modulation mode control circuit of claim 2, wherein the PWM threshold voltage generator is configured to generate a first current for controlling a voltage of the first resistor at a predetermined reference voltage, mirror a third current that is a sum of the first current and a predetermined second current, supply the mirrored current to a second resistor, and generate the PWM threshold voltage by adding a predetermined offset voltage to a voltage generated from the second resistor.

4. The modulation mode control circuit of claim 3, wherein the PWM threshold voltage generator comprises:

a first operational amplifier including an inverting terminal connected to the first resistor and a non-inverting terminal to which the reference voltage is inputted;

a first transistor including a gate connected to an output terminal of the first operational amplifier and a first end connected to the first resistor, the first current flowing through the first transistor in response to an output of the first operational amplifier;

a current source connected to a second end of the first transistor and configured to sink the second current; and a first current mirror circuit connected to a second end of the first transistor and configured to mirror the third current and supply the mirrored current to the second resistor.

5. The modulation mode control circuit of claim 4, wherein:

the PWM threshold voltage generator further comprises a second operational amplifier including an output terminal and an inverting terminal connected to a first end of the second resistor and a non-inverting terminal to which the offset voltage is inputted, wherein the third current flows through the second resistor and a voltage at a second end of the second resistor is the PWM threshold voltage.

6. The modulation mode control circuit of claim 2, wherein the PWM reference voltage generator is configured to generate a fourth current based on the control voltage, generate a fifth current based on the predetermined reference voltage and generate the PWM reference voltage using the PWM threshold voltage and a current corresponding to a difference between the fifth current and the fourth current.

7. The modulation mode control circuit of claim 6, wherein the PWM reference voltage generator comprises:

a third operational amplifier including a non-inverting terminal to which the control voltage is inputted and an inverting terminal connected to a third resistor;

a second transistor including a gate connected to an output of the third operational amplifier and a first end connected to the inverting terminal of the third operational amplifier; and a second current mirror circuit connected to a second end of the second transistor and configured to mirror the fourth current flowing through the second transistor.

8. The modulation mode control circuit of claim 6, wherein the PWM reference voltage generator comprises:

a fourth operational amplifier including a non-inverting terminal to which the reference voltage is inputted and an inverting terminal connected to a fourth resistor;

a third transistor including a gate connected to an output of the fourth operational amplifier and a first end connected to the inverting terminal of the fourth operational amplifier; and a third current mirror circuit connected to a second end of the third transistor and configured to mirror the fifth current flowing through the third transistor.

9. The modulation mode control circuit of claim 6, wherein the PWM reference voltage generator comprises:

a fifth operational amplifier including a non-inverting terminal to which the PWM threshold voltage is inputted, an inverting terminal and an output terminal connected to the inverting terminal;

a fifth resistor connected between the output terminal of the fifth operational amplifier and a node from which the PWM reference voltage is generated; and a fourth current mirror circuit connected to the node and configured to mirror the fourth current, wherein a current difference between the fifth current and the fourth current flows through the fifth resistor.

10. The modulation mode control circuit of claim 1, wherein the control signal generation unit comprises:

a first comparator configured to compare the control voltage with the oscillation control signal;

a second comparator configured to compare the PWM threshold voltage with the oscillation control signal; and an AND gate configured to generate the first control signal based on an output of the first comparator and an output of the second comparator.

11. The modulation mode control circuit of claim 10, wherein:

the control signal generation unit further comprises a third comparator configured to compare a limit voltage for controlling a maximum frequency of the switching operation in PWM mode with the oscillation control signal and an OR gate configured to perform an OR operation of the output of the second comparator and an output of the third comparator, wherein the AND gate is configured to generate the first control signal by performing an AND operation on an output of the OR gate and the output of the first comparator.

12. A switch control circuit for controlling a switching operation of at least one power switch for controlling power supply, the switch control circuit comprising:

an oscillation control signal generator configured to generate an oscillation control signal for controlling the switching operation of the at least one power switch;

a modulation mode control circuit configured to select a modulation mode based on a result of a comparison between a control voltage based on an output voltage of the power supply and a PWM threshold voltage determined by an external resistor, generate a PWM reference voltage using the PWM threshold voltage and the control voltage, generate a first control signal based on a result of a comparison between the oscillation control signal and the control voltage and a result of a comparison between a first signal and the PWM threshold voltage, and generate a second control signal based on a result of a comparison between the first signal and the PWM reference voltage; and an oscillator configured to generate at least one clock signal for controlling the at least one power switch using at least one of the first control signal and the second control signal in the selected modulation mode.

13. The switch control circuit of claim 12, wherein the oscillator is configured to generate the at least one clock signal based on the first control signal when the selected modulation mode is PFM mode.

14. The switch control circuit of claim 13, wherein the oscillator is configured to decrease the at least one clock signal to a low level in synchronization with a rising edge of the first control signal and increase the at least one clock signal to a high level at a point of time at which a period in which the at least one clock signal is enabled in an immediately previous switching cycle has elapsed from the rising edge of the first control signal.

15. The switch control circuit of claim 12, wherein the oscillator is configured to generate the at least one clock signal based on the first control signal and the second control signal if the selected modulation mode is PWM mode.

16. The switch control circuit of claim 15, wherein the oscillator is configured to increase the at least one clock signal in synchronization with a rising edge of the second control signal and decrease the at least one clock signal in synchronization with a rising edge of the first control signal.

17. The switch control circuit of claim 16, wherein:

the at least one clock signal comprises first and second clock signals; and the oscillator is configured to increase the first clock signal in synchronization with the rising edge of the second control signal, decrease the first clock signal and increase the second clock signal in synchronization with the rising edge of the first control signal, and decrease the second clock signal at a point of time after a period in which the first clock signal is a high level has elapsed from a point of time at which the second clock signal rises.

18. The switch control circuit of claim 17, wherein:

the oscillator is configured to start to increase the oscillation control signal at a point of time at which a first period has elapsed from a point of time at which the second clock signal falls, wherein the first period is a period from a point of time at which the oscillation control signal starts to an increase to the rising edge of the second control signal.

19. The switch control circuit of claim 12, wherein the oscillation control signal generator is configured to generate the oscillation control signal by adding a voltage obtained by detecting a current according to the power supply to a voltage that increases during a period in which the at least one clock signal is enabled.

20. A power supply device, comprising:

at least one power switch connected to a winding on a primary side;

at least one synchronization rectification switch configured to generate an output voltage by synchronizing and rectifying a current flowing through a winding on a secondary side; and a switch control circuit configured to select a modulation mode based on a result of a comparison between a control voltage based on the output voltage and a PWM threshold voltage determined by a resistor, generate a PWM reference voltage using the PWM threshold voltage and the control voltage, generate a first control signal based on a result of a comparison between an oscillation control signal and the control voltage and a result of a comparison between a first signal and the PWM threshold voltage, generate a second control signal based on a result of a comparison between the first signal and the PWM reference voltage, and generate at least one clock signal for controlling the at least one power switch using at least one of the first control signal and the second control signal based on the selected modulation mode.

* * * * *